US011778271B2

(12) United States Patent
Dhiman et al.

(10) Patent No.: US 11,778,271 B2
(45) Date of Patent: Oct. 3, 2023

(54) CLASSIFYING PARENTAL RATING FOR BETTER VIEWING EXPERIENCE

(71) Applicant: Rovi Guides, Inc., San Jose, CA (US)

(72) Inventors: Rohit Dhiman, Uttarakhand (IN); Ashish Gupta, Karnataka (IN); Vaibhav Gupta, Karnataka (IN); Senthil Kumar Karuppasamy, Bangalore (IN); Anil Kumar, Haryana (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/216,213

(22) Filed: Mar. 29, 2021

(65) Prior Publication Data
US 2022/0312075 A1    Sep. 29, 2022

(51) Int. Cl.
*H04N 21/454* (2011.01)
*H04N 21/45* (2011.01)
*G06N 20/00* (2019.01)
*G06F 16/45* (2019.01)
*G06F 16/48* (2019.01)
*H04N 21/466* (2011.01)
*G06V 20/40* (2022.01)

(52) U.S. Cl.
CPC ........ *H04N 21/4542* (2013.01); *G06F 16/45* (2019.01); *G06F 16/48* (2019.01); *G06N 20/00* (2019.01); *G06V 20/41* (2022.01); *H04N 21/4532* (2013.01); *H04N 21/4662* (2013.01)

(58) Field of Classification Search
None
See application file for complete search history.

(56) References Cited

U.S. PATENT DOCUMENTS

| 7,761,892 B2 | 7/2010 | Ellis et al. | |
| 2020/0097731 A1* | 3/2020 | Gupta | G06V 20/41 |
| 2020/0145723 A1* | 5/2020 | Vaughn | H04N 21/4402 |

OTHER PUBLICATIONS

U.S. Appl. No. 17/107,445, filed Nov. 30, 2020.

* cited by examiner

*Primary Examiner* — Omar S Parra
(74) *Attorney, Agent, or Firm* — HALEY GUILIANO LLP

(57) ABSTRACT

The present disclosure relates to limiting viewing of media content. More particularly, the present invention relates to classifying segments of content for limited viewing based on user preferences and classifications.

According to a first aspect, there is provided a method for parental control of media content for a media guidance application, the method comprising, determining user preferences comprising settings for restricting viewing of segments of media content, determining media content for user consumption on a user device, determining a classification of each of a plurality of segments of the media content using a content analyzer and classifier, and comparing the determined classifications against the user preferences. In response to the comparing, the method further comprises the steps of, determining an action associated with the determined classification for restricting viewing of one or more of the plurality of segments of the media asset and modifying the one or more of the plurality of segments based on the determined action.

20 Claims, 4 Drawing Sheets

CLASSIFYING PARENTAL RATING FOR BETTER VIEWING EXPERIENCE

FIELD

The present disclosure relates to restricting viewing of segments of media content. More particularly, the present invention relates to classifying segments of content for restricted viewing based on user preferences and content classifications.

BACKGROUND

In conventional systems, users may access media content from a plurality of sources. In some cases, media content from a particular source or of a particular type may not be appropriate for all viewers. For example, media content featuring violence may not be appropriate for children under a particular age. To prevent viewers from viewing objectionable content, many media systems include parental control features. Such parental control features often allow a user, e.g., a parent of a child, to block media content based on one or more criteria, e.g., a source of the media content, a content rating of the media content, etc. While such systems are helpful in blocking media content of a particular type, they do not allow for the flexibility required to differentiate content in a dynamic and individualized manner, nor do such systems allow for limiting or restricting a viewer's exposure to segments of media content based on specific classifications and content analysis.

In view of the foregoing, it would be beneficial to have methods and systems that automatically implement techniques for restricting segments of content for a better and personalized viewing experience for users.

SUMMARY

Systems and methods are described herein suitable for automatically implementing parental controls for a media guidance application. More particularly, embodiments disclosed herein may not be tied to express parental control and may be implemented for restricted viewing in public spaces, corporate environments, and schools, for example.

According to a first aspect, there is provided a method for parental control of media content for a media guidance application, the method comprising, determining user preferences comprising settings for restricting viewing of segments of media content, determining media content for user consumption on a user device, determining a classification of each of a plurality of segments of the media content using a content analyzer and classifier, and comparing the determined classifications against the user preferences. In response to the comparing, the method further comprises the steps of, determining an action associated with the determined classification for restricting viewing of one or more of the plurality of segments of the media asset and modifying the one or more of the plurality of segments based on the determined action.

Accordingly, methods and systems are disclosed herein for a media guidance application that provides advanced control features for media content based on user preferences, for example. As described herein, advanced control settings may allow users to establish segments of content to be restricted in a dynamic manner.

In some embodiments, the step of determining user preferences comprises retrieving a user profile.

In some embodiments, the step of determining user preferences comprises determining previous user behavior associated with the classification. In some embodiments, the step of determining a classification is carried out dynamically during or prior to media content being consumed by the user.

In some embodiments, the classification comprises at least a category and a parental rating. In some embodiments, the step of determining a classification comprises determining a confidence value or level of the classification of each of the plurality of segments and determining that the confidence level is over a confidence threshold.

The confidence value may be generated with a trained network. For example, the confidence value may be generated by a trained artificial intelligence engine, by a trained neural network and/or by machine learning. This may occur through supervised learning, semi-supervised learning and/or unsupervised learning.

In some embodiments, the action comprises any one of fast forward, blur segment, skip segment, place or play an advertisement, or notify the user. Optionally, the action is determined based on previous user behavior.

For example, while a user is viewing the content, an action may be performed in the form of any one or more of an overlay/a whisper/a pop-up message, for example, and can be displayed to the end user to notify that some specific rated segment is about to play, and based on the messages the end user might not be interested in watching that segment, and the client devices will provide the alternatives such as "skip the segment" or "blur segment" or "play an ad" for the segment duration, or perform any action automatically.

The action of the method may be one of displaying a pop-up or blocking access to a segment of media content, based on classifications requiring limited viewing as indicated by the user, or based on past user behavior. For example, the pop-up may be a warning to a user that if they continue the action that they are performing, then another action may be performed. Blocking access to all content may comprise preventing access to a network, for example, the internet. Transmitting a message may comprise displaying an alert at another computing device, for example, displaying an alert on a mobile phone.

Optionally, the method further comprises displaying a modified media asset comprising the modified one or more of the plurality of segments. Optionally, the step of modifying the one or more of the plurality of segments comprises the action being carried out dynamically during or prior to the media content being consumed by the user.

According to a second aspect, there is provided a system for parental control of a media asset, the system comprising, means for determining user preferences comprising settings for restricting viewing of segments of media content; means for determining media content for user consumption on a user device; means for determining a classification of each of a plurality of segments of the media content using a content analyzer and classifier; and means for comparing the determined classification against the user preferences. Furthermore, the system comprises, in response to the comparing, means for determining an action associated with the classification based on the user preferences for restricting viewing of one or more of the plurality of segments of the media asset; and means for modifying the segment of the media content based on the determined action.

It should be appreciated that other features, aspects and variations of the present invention will be apparent from the disclosure herein of the drawings and detailed description. Additionally, it will be further appreciated that additional or alternative embodiments of parent control or techniques for limiting user exposure to content may be implemented within the principles set out by the present disclosure.

BRIEF DESCRIPTION OF THE DRAWINGS

The above and other objects and advantages of the disclosure will be apparent upon consideration of the following detailed description, taken in conjunction with the accompanying drawings, in which.

Figure 1:
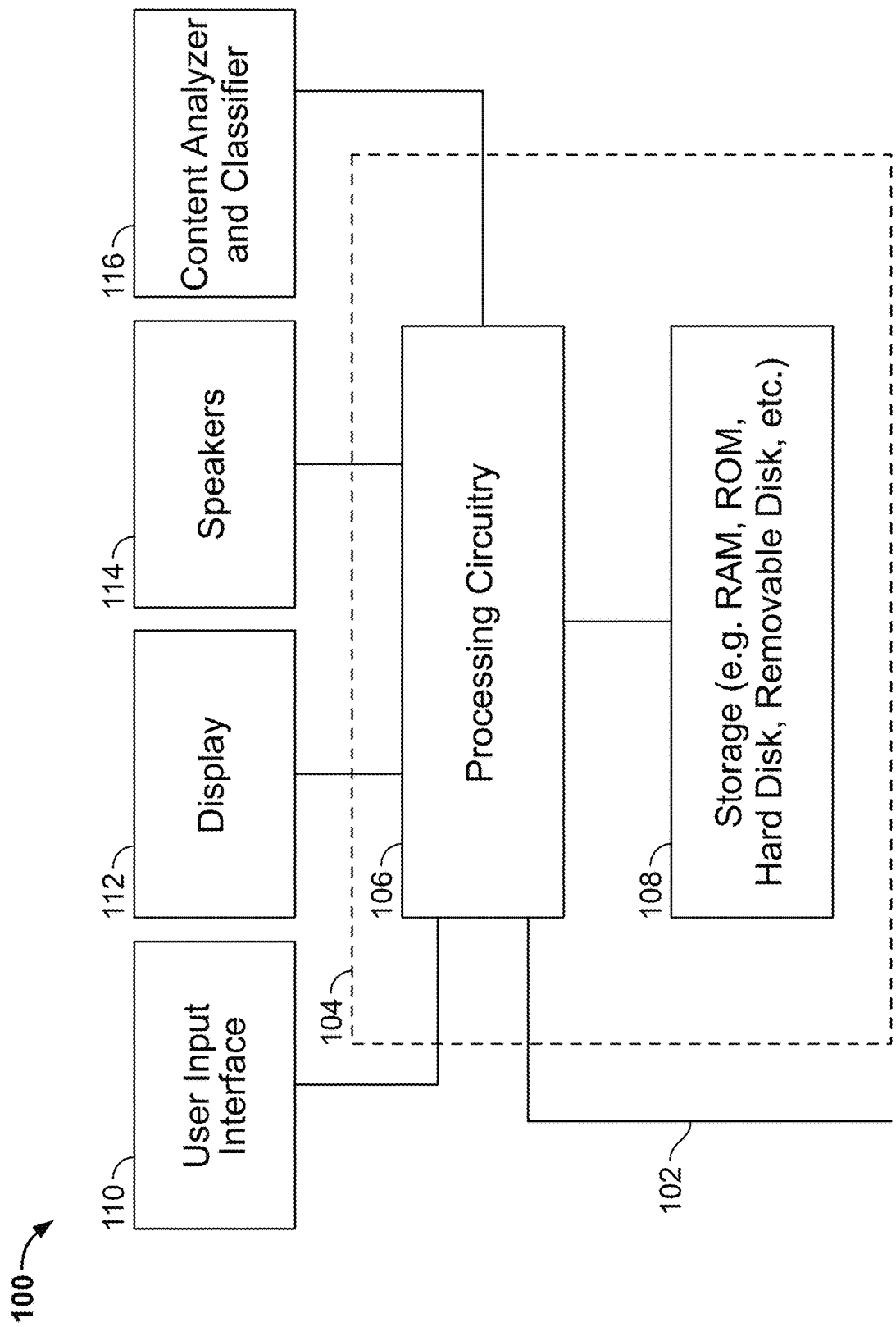
FIG. 1 shows an illustrative depiction of an example user device, in accordance with some embodiments of the present disclosure.

The figures herein depict various embodiments of the disclosures invention for purposes of illustration only. It will be appreciated that additional or alternative structures, systems and methods may be implemented within the principles set out by the present disclosure.

DETAILED DESCRIPTION

As referred to herein, a "media guidance application" or a "guidance application" is an application that provides media guidance data to a user through an interface. For example, a media guidance application may allow users to efficiently navigate content selections and easily identify content that they may desire. The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, random access memory (RAM), etc.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

As referred to herein, the terms "media asset" and "media content item" should be understood to mean an electronically consumable user asset or content, such as a live televised program, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate and locate content.

As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same.

Users may access content and the media guidance application (and its display screens described above and below) from one or more of their user equipment devices. FIG. 1 shows a generalized embodiment of illustrative user equipment device 100. More specific implementations of user equipment devices are discussed below in connection with FIG. 2. User equipment device 100 may receive content and data via input/output (hereinafter "I/O") path 102. I/O path 102 may provide content (e.g., broadcast programming, on-demand programming, Internet content, content available over a local area network (LAN) or wide area network (WAN), and/or other content) and data to control circuitry 104, which includes processing circuitry 106 and storage 108. Control circuitry 104 may be used to send and receive commands, requests, and other suitable data using I/O path 102. I/O path 102 may connect control circuitry 104 (and specifically processing circuitry 106) to one or more communications paths (described below). I/O functions may be provided by one or more of these communications paths, but are shown as a single path in FIG. 1 to avoid overcomplicating the drawing.

Control circuitry 104 may be based on any suitable processing circuitry such as processing circuitry 106. As referred to herein, processing circuitry should be understood to mean circuitry based on one or more microprocessors, microcontrollers, digital signal processors, programmable logic devices, field programmable gate arrays (FPGAs), application-specific integrated circuits (ASICs), etc., and may include a multi-core processor (e.g., dual-core, quad-core, hexacore, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 104 executes instructions for a media guidance application stored in memory (i.e., storage 108). Specifically, control circuitry 104 may be instructed by the media guidance application to perform the functions discussed above and below. For example, the media guidance application may provide instructions to control circuitry 104 to generate the media guidance displays. In some implementations, any action performed by control circuitry 104 may be based on instructions received from the media guidance application.

In client-server based embodiments, control circuitry 104 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 2). In addition, communications circuitry may include circuitry that enables peer-to-peer communication of user equipment devices, or communication of user equipment devices in locations remote from each other.

Memory may be an electronic storage device provided as storage 108 that is part of control circuitry 104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 108 may be used to store various types of content described herein as well as media guidance data described above. Nonvolatile memory may also be used (e.g., to launch a boot-up routine and other instructions). Cloud-based storage, described in relation to FIG. 2, may be used to supplement storage 108 or instead of storage 108.

Control circuitry 104 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 104 may also include scaler circuitry for upconverting and downconverting content into the preferred output format of the user equipment 100. Circuitry 104 may also include digital-to-analog converter circuitry and analog-to-digital converter circuitry for converting between digital and analog signals.

The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 108 is provided as a separate device from user equipment 100, the tuning and encoding circuitry (including multiple tuners) may be associated with storage 108.

A user may send instructions to control circuitry 104 using user input interface 110. User input interface 110 may be any suitable user interface, such as a remote control, mouse, trackball, keypad, keyboard, touchscreen, touchpad, stylus input, joystick, voice recognition interface, or other user input interfaces.

Display 112 may be provided as a stand-alone device or integrated with other elements of user equipment device 100. For example, display 112 may be a touchscreen or touch-sensitive display. In such circumstances, user input interface 112 may be integrated with or combined with display 112. Display 112 may be one or more of a monitor, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 112 may be HDTV-capable. In some embodiments, display 112 may be a 3D display, and the interactive media guidance application and any suitable content may be displayed in 3D. A video card or graphics card may generate the output to the display 112. The video card may offer various functions such as accelerated rendering of 3D scenes and 2D graphics, MPEG5 2/MPEG-4 decoding, TV output, or the ability to connect multiple monitors. The video card may be any processing circuitry described above in relation to control circuitry 104. The video card may be integrated with the control circuitry 104. Speakers 114 may be provided as integrated with other elements of user equipment device 100 or may be stand-alone units. The audio component of videos and other content displayed on display 112 may be played through speakers 114. In some embodiments, the audio may be distributed to a receiver (not shown), which processes and outputs the audio via speakers 114.

User equipment device 100 may also incorporate or be accessible to one or more other modules. For example, a content analyzer and classification 116 including various components (e.g., an image analysis component, an audio analysis component, etc.), which will be described further below.

The media guidance application may be implemented using any suitable architecture. For example, it may be a stand-alone application wholly-implemented on a user equipment device 100. In such an approach, instructions of the application are stored locally (e.g., in storage 108), and data for use by the application is downloaded on a periodic basis (e.g., from an out-of-band feed, from an Internet resource, or using another suitable approach). Control circuitry 104 may retrieve instructions of the application from storage 108 and process the instructions to generate any of the displays discussed herein. Based on the processed instructions, control circuitry 104 may determine what action to perform when input is received from input interface 110. For example, movement of a cursor on a display up/down may be indicated by the processed instructions when input interface 110 indicates that an up/down button was selected.

In some embodiments, the media guidance application is a client-server based application. Data for use by a thick or thin client implemented on user equipment device 100 is retrieved on-demand by issuing requests to a server remote to the user equipment device 100. In one example of a client-server based guidance application, control circuitry 104 runs a web browser that interprets web pages provided by a remote server. For example, the remote server may store the instructions for the application in a storage device. The remote server may process the stored instructions using circuitry (e.g., control circuitry 104) and generate the displays discussed above and below.

The client device may receive the displays generated by the remote server and may display the content of the displays locally on equipment device 100. This way, the processing of the instructions is performed remotely by the server while the resulting displays are provided locally on equipment device 100. Equipment device 100 may receive inputs from the user via input interface 110 and transmit those inputs to the remote server for processing and generating the corresponding displays. For example, equipment device 100 may transmit a communication to the remote server indicating that an up/down button was selected via input interface 110. The remote server may process instructions in accordance with that input and generate a display of the application corresponding to the input (e.g., a display that moves using a cursor up/down). The generated display is then transmitted to equipment device 100 for presentation to the user.

In some embodiments, the media guidance application is downloaded and interpreted or otherwise run by an interpreter or virtual machine (run by control circuitry 104). In some embodiments, the guidance application may be encoded in the ETV Binary Interchange Format (EBIF), received by control circuitry 104 as part of a suitable feed, and interpreted by a user agent running on control circuitry 104. For example, the guidance application may be an EBIF application. In some embodiments, the guidance application may be defined by a series of JAVA-based files that are received and run by a local virtual machine or other suitable middleware executed by control circuitry 104. In some of such embodiments (e.g., those employing MPEG-2 or other digital media encoding schemes), the guidance application may be, for example, encoded and transmitted in an MPEG-2 object carousel with the MPEG audio and video packets of a program.

Figure 2:
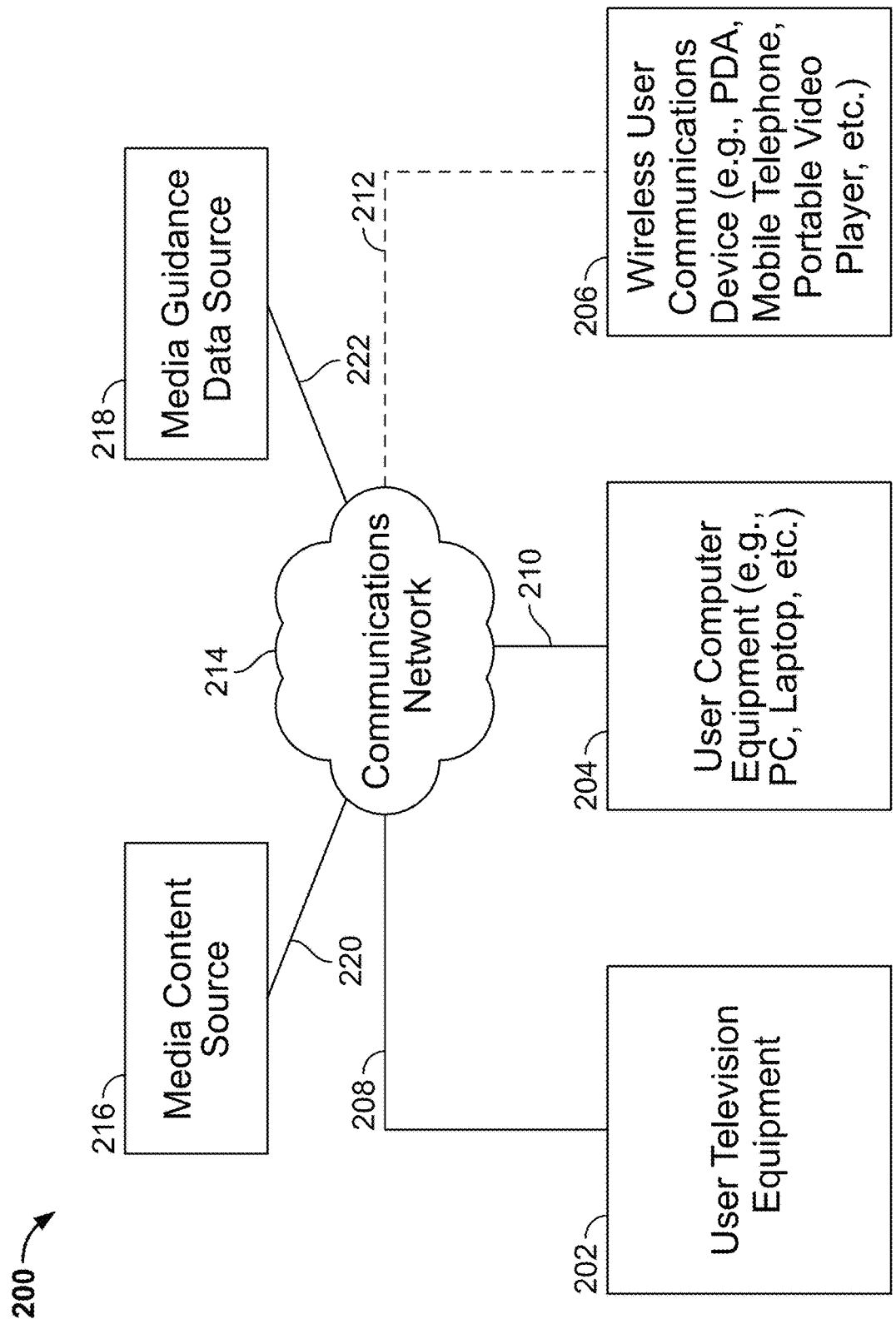
FIG. 2 shows a block diagram of an illustrative user equipment system, in accordance with some embodiments of the present disclosure.

User equipment device 100 of FIG. 1 can be implemented in system 200 of FIG. 2 as user television equipment 202, user computer equipment 204, wireless user communications device 206, or any other type of user equipment suitable for accessing content. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 1 may not be classified solely as user television equipment 202, user computer equipment 204, or a wireless user communications device 206. For example, user television equipment 202 may, like some user computer equipment 204, be Internet-enabled allowing for access to Internet content, while user computer equipment 204 may, like some television equipment 202, include a tuner allowing for access to television programming. The media guidance application may have the same layout on various different types of user equipment or may be tailored to the display capabilities of the user equipment. For example, on user computer equipment 204, the guidance application may be provided as a web site accessed by a web browser. In another example, the guidance application may be scaled down for wireless user communications devices 206.

In system 200, there may be more than one of each type of user equipment device but only one of each is shown in FIG. 2 to avoid overcomplicating the drawing. In addition, each user may utilize more than one type of user equipment device and also more than one of each type of user equipment device. In some embodiments, a user equipment device (e.g., user television equipment 202, user computer equipment 204, wireless user communications device 206) may be referred to as a "second screen device" or "secondary device".

The user may also set various settings to maintain consistent media guidance application settings, e.g., volume settings, across in-home devices and remote devices. Settings include programming preferences that the guidance application utilizes to make programming recommendations, display preferences, and other desirable guidance settings. For example, if a user sets a preferred volume level as a favorite volume level on, for example, a web site mobile phone, the same settings would appear on the user's in-home devices (e.g., user television equipment and user computer equipment), if desired. Therefore, changes made on one user equipment device can change the guidance experience on another user equipment device, regardless of whether they are the same or a different type of user equipment device.

The user equipment devices may be coupled to communications network 214. Namely, user television equipment 202, user computer equipment 204, and wireless user communications device 206 are coupled to communications network 214 via communications paths 208, 210, and 212, respectively. Communications network 214 may be one or more networks including the Internet, a mobile phone network, mobile voice or data network (e.g., a 4G or LTE network), cable network, public switched telephone network, or other types of communications network or combinations of communications networks. Paths 208, 210, and 212 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Path 212 is drawn with dotted lines to indicate that in the exemplary embodiment shown in FIG. 2 it is a wireless path and paths 208 and 210 are drawn as solid lines to indicate they are wired paths (although these paths may be wireless paths, if desired). Communications with the user equipment devices may be provided by one or more of these communications paths, but are shown as a single path in FIG. 2 to avoid overcomplicating the drawing.

Although communications paths are not drawn between user equipment devices, these devices may communicate directly with each other via communication paths, such as those described above in connection with paths 208, 210, and 212, as well as other short-range point-to-point communication paths, such as USB cables, IEEE 1394 cables, wireless paths (e.g., Bluetooth, infrared, IEEE 702-11x, etc.), or other short-range communication via wired or wireless paths. BLUETOOTH is a certification mark owned by Bluetooth SIG, INC. The user equipment devices may also communicate with each other directly through an indirect path via communications network 214.

System 200 includes content source 216 and media guidance data source 218 coupled to communications network 214 via communication paths 220 and 222, respectively. Paths 220 and 222 may include any of the communication paths described above in connection with paths 208, 210, and 212. Communications with the content source 216 and media guidance data source 218 may be exchanged over one or more communications paths, but are shown as a single path in FIG. 2 to avoid overcomplicating the drawing. In addition, there may be more than one of each of content source 216 and media guidance data source 218, but only one of each is shown in FIG. 2 to avoid overcomplicating the drawing. (The different types of each of these sources are discussed below.) If desired, content source 216 and media guidance data source 218 may be integrated as one source device. Although communications between sources 216 and 218 with user equipment devices 202, 204, and 206 are shown as through communications network 214, in some embodiments, sources 216 and 218 may communicate directly with user equipment devices 202, 204, and 206 via communication paths (not shown) such as those described above in connection with paths 208, 210, and 212.

Content source 216 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 216 may be the originator of content (e.g., a television broadcaster, a Webcast provider, etc.) or may not be the originator of content (e.g., an on-demand content provider, an Internet provider of content of broadcast programs for downloading, etc.). Content source 216 may include cable sources, satellite providers, on-demand providers, Internet providers, over-the-top content providers, or other providers of content. Content source 216 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 218 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Media guidance applications may be, for example, stand-alone applications implemented on user equipment devices. For example, the media guidance application may be implemented as software or a set of executable instructions which may be stored in storage 108, and executed by control circuitry 104 of a user equipment device 100. In some embodiments, media guidance applications may be client-server applications where only a client application resides on the user equipment device, and server application resides on a remote server. For example, media guidance applications may be implemented partially as a client application on control circuitry 104 of user equipment device 100 and partially on a remote server as a server application (e.g., media guidance data source 218) running on control circuitry of the remote server. When executed by control circuitry of the remote server (such as media guidance data source 218), the media guidance application may instruct the control circuitry to generate the guidance application displays and transmit the generated displays to the user equipment devices. The server application may instruct the control circuitry of the media guidance data source 218 to transmit data for storage on the user equipment. The client application may instruct control circuitry of the receiving user equipment to generate the guidance application displays.

Content and/or media guidance data delivered to user equipment devices 202, 204, and 206 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT. In addition to content and/or media guidance data, providers of OTT content can distribute media guidance applications (e.g., web-based applications or cloud-based applications), or the content can be displayed by media guidance applications stored on the user equipment device.

Media guidance system 200 is intended to illustrate various approaches, or network configurations, by which user equipment devices and sources of content and guidance data may communicate with each other for the purpose of accessing content and providing media guidance. The embodiments described herein may be applied in any approach that does not deviate from the teachings of this disclosure, for example in a system employing an approach for delivering content and providing media guidance.

In an example approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 214. These cloud resources may include one or more content sources 216 and one or more media guidance data sources 218. In addition or in the alternative, the remote computing sites may include other user equipment devices, such as user television equipment 202, user computer equipment 204, and wireless user communications device 206. For example, the other user equipment devices may provide access to a stored copy of a video or a streamed video.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 1.

With the proliferation of computing devices, such as laptops, smartphones and tablets, there has been an increase in the use of systems that can display content, e.g., a movie, a television program, an audio broadcast and/or a website, to a user. A user may access content that is appropriate for the user, e.g., a 12-year-old accessing a cartoon. However, the same user may also access content that contains one or more segments/portions or scenes that are not appropriate for the user to consume, e.g., a movie containing abusive content. In order to prevent users from accessing content that is not appropriate for them, parents may use some form of parental controls to control the content that a user can access on a user device, e.g., a word-based filter to prevent a user from accessing adult websites.

However, users find ways of traversing parental control software, for example, by using a proxy, guessing a password and/or misrepresenting their age. If a group of parents, e.g., a group of parents at a school, use the same parental control software, then children may share ways of traversing the blocks and protections implemented by the parental control software, making the software redundant. Further, rule-based solutions, such as blocking all access to proxies, are not always desirable for a user.

Furthermore, conventional systems do not allow for limited viewing or restricted viewing of specific portions or segments of media content. Rather, using conventional methods and systems, it is only possible to preset settings to block access to content items as a whole or block access to a group of contents, e.g., by blocking access to a website or specific channel. Thus, it would be beneficial to be able to accommodate for a more flexible approach to parental control or classification control of media content in restricting content consumption.

Parental control ratings of media content, currently, are very generic are determined based on the content item as a whole. For example, an 18+ rating may be assigned to a content item that comprises a certain level of nudity, abusive language and/or violence. However, some users may be comfortable watching content having abusive language but may not be comfortable watching nude scenes. Parental control software of conventional systems mentioned above are not suitable for such cases.

In view of the foregoing, it would be beneficial to have a system that automatically implements limited or restricted viewing classifications and techniques for a better viewing experience of media content for users. Systems and methods are described herein for automatically implementing parental controls for a media guidance application. More particularly, the embodiments disclosed herein may not be tied to express parental control and may be further implemented for restricted viewing in public spaces, corporate environments and schools, for example.

Example embodiments herein seek to classify media content further than merely using conventional parental ratings, e.g., 18+ and PG. Media content and segments of media content can be analyzed and classified into classifications, e.g., 18+ and nude, 18+ and abuse, 18+ and violence, PG and nude, PG and abuse, and PG and violence. It will be appreciated that any combination of parental rating and category of content, e.g., nude, abuse etc., may be possible in forming a classification. In some embodiments, in determining user preferences for restricted viewing content, on the client side, the user may be asked to select a category along with a parental rating. Samples of content from each category may be provided so that user exactly knows what classifications of content to allow.

In some embodiments, the user may be shown example content of various classifications, e.g., 18+ and abuse, 18+ and violence, and PG and abuse, in order to assist the user in making an informed decision when the user is requested to populate his/her user profile or preferences. In some embodiments, the user may input classifications as part of his/her preferences when creating a user profile without viewing example content.

Figure 3:
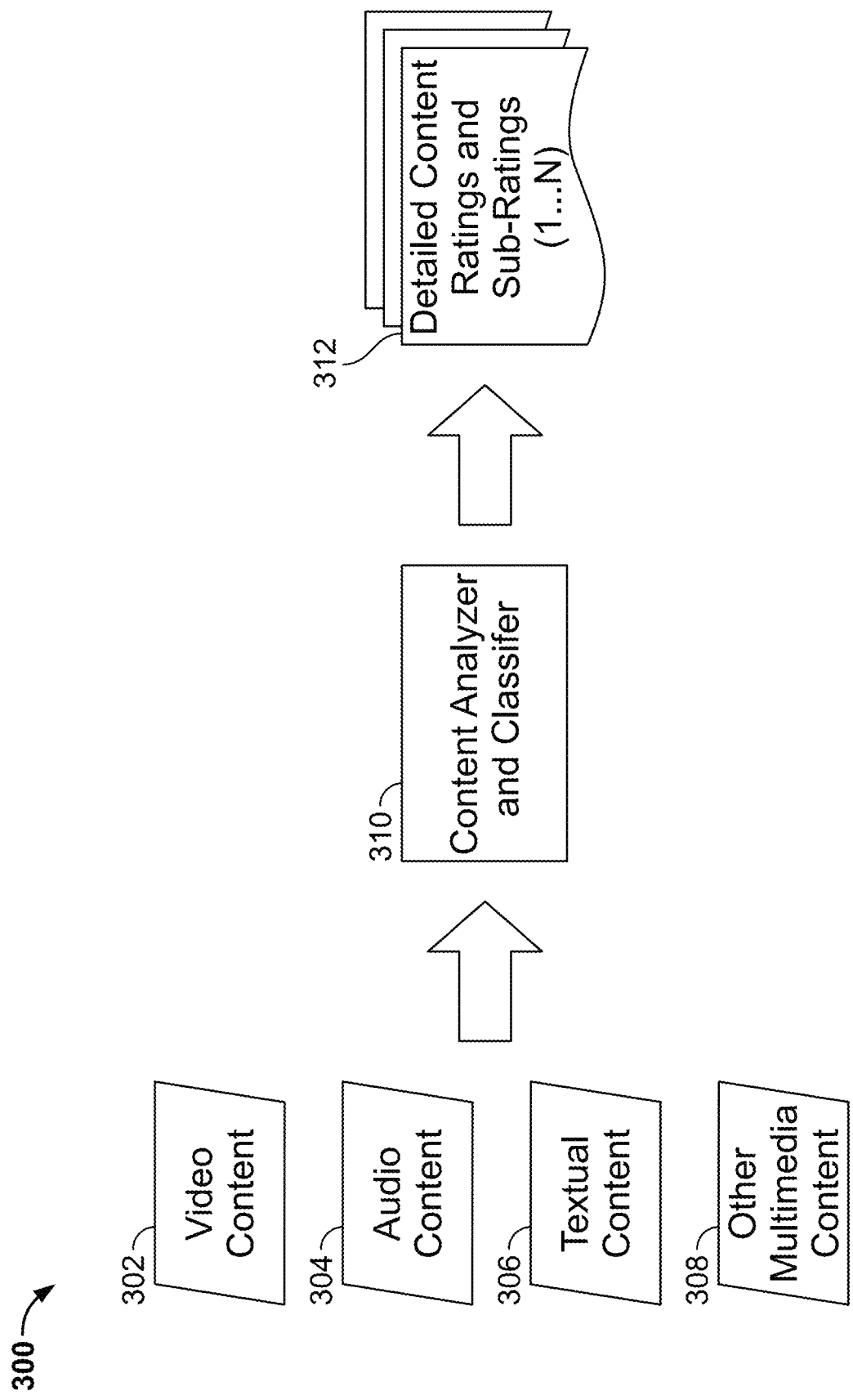
FIG. 3 is an illustrative block diagram showing an overview of the content analysis and classification process, in accordance with example embodiments of the disclosure.

With reference to FIG. 3, various embodiments of the present invention will now be described. In example embodiments, a content analyzer and classifier 310 analyzes media assets in order to determine one or more relevant categories and/or parental ratings for those media assets and to generate a specific and robust classification per segment of media content. In some embodiments, the content analyzer and classifier 310 may analyze video content 302, audio content 304, and textual (e.g., SRT, TTML) content 306, or other multimedia content 308, or any combination of content, within media assets to, e.g., determine the vulgarity level of a segment of content, and determine a classification to provide a more detailed and robust depiction of content for user consumption.

In some embodiments such as in FIG. 3, for a specific parental rating, the classification module, e.g., content analyzer and classifier 310, may identify a plurality of classifications 312 combining parental ratings, e.g., 18+, with various combinations of categories, e.g., nudity or violence. For instance, if the content is rated 18+, the module will identify classifications 312, e.g., 18-nude, 18-abuse, 18-violence. Alternatively, the classification module may identify a parental rating corresponding to categories such as nudity determined for each segment of media content, e.g., to identity classifications such as PG-nude or 18+-nude. The content analyzer and classifier 310, in example embodiments, uses machine learning and artificial intelligence techniques in order to identify parental ratings and categories, and therefore the classifications, of segments of media assets in an automated or semi-automated manner. In example embodiments, media content or media assets may be classified per segment, per frame, or per scene, for example.

Thus, in example embodiments, rather than simply checking for parental ratings assigned to media content, e.g., a movie, the system can be programmed to check for and determine a combination of ratings and categories to form detailed classifications relevant to segments of that media content. In this way, media content may be annotated with a plurality of classifications and provide a more detailed knowledge of the content. This is beneficial as different users will have different preferences or requirements when it comes to viewing content alone or when viewing content with a group of people. For example, a user may be comfortable with viewing 18-violence segments but uncomfortable with viewing 18-nude segments in the same media asset. In a further example, a user may be comfortable with viewing 18-violence content when viewing media content with his/her parents, uncomfortable with viewing 18-nude content with his/her parents, and comfortable watching all classifications of content when alone.

Thus, it is an aim of this disclosure to provide methods and systems suitable for overcoming such scenarios, although methods and systems described herein are not limited to home environments and can be implemented in other environments where restricted access of content or restricted viewing experiences may be required, e.g., schools or corporate environments.

In some embodiments, following the classification of segments of media content, the classification module can generate a detailed manifest, or report. For example, the manifest generated by the content analyzer and classifier 310 can be used to provide a better viewing experience for users. In some embodiments, whenever the user wants to watch media content, the user may be provided with a list of classification options from which the users can choose based on his/her individual preferences. In some embodiments, the classification information for each media asset can also be provided in the program description of the media content and/or as part of the content preview. In some embodiments, the media guidance application may recommend content to the user based on his/her preference, profile or past behavior. For example, past behavior may include determining that the user typically fast-forwards or skips a scene of a particular classification.

In some embodiments, classified ratings, i.e., classifications, such as 18-nude, 18-abuse, 18-violence, PG-nude, PG-abuse and PG-violence may be sent to the user for the user to indicate restricted viewing for any one or more classifications. This can be done through a user profile or in the settings for a user device, for example. In some embodiments, a user's profile may be prepopulated based on past user behavior. In this way, if a user is restricted from watching a specific type of classified content segment, the media guidance application may choose to skip the segment that is associated with that classification, blur that segment or play an ad for the duration of that segment. Restricted viewing experiences are not limited to video content. For example, for audio content, the segment of audio content containing unwanted content may be muted or overlaid with a "beep" sound during playback, for example.

In one example, a media guidance application implemented on a user device may retrieve a criteria for a media asset. For example, the media guidance application may retrieve a user profile, in which the user profile indicates one or more classifications for restricted viewing. Based on the classifications indicated by the user, the media guidance application may restrict viewing of content, e.g., scenes or segments containing content that is assigned restricted classifications. Additionally and/or alternatively, the user profile may be stored at a server and retrieved by the computing device or media guidance application when a user provides a user credential.

Upon determining the user's preferences to restrict certain classifications of content, the media guidance application may then detect a media asset being consumed by the first user, or about to be consumed by the user or to be consumed by the user (e.g., based on future viewing schedule), and compare the media asset to the criteria, e.g., a list of restricted classifications. For example, the media guidance application may apply restricted viewing techniques to segments of media content associated with restricted classifications in response to detecting that the first user is consuming or is about to consume restricted segments.

When applying the classifications, the media guidance application may compare media assets being consumed by a user to the user's preferences, e.g., defined by user criteria, corresponding to classifications. For example, the media guidance application may continuously compare media assets to the ever-changing information in the user profile to categorize media content in a dynamic and individualized manner, e.g., in real time, or prior to the consumption of media assets if classification data is available for those media assets. In some embodiments, the media guidance application may compare media assets to a user's preferences prior to consumption in order to apply one or more restricted viewing techniques to the one or more segments determined as requiring some form of restriction. In some embodiments, restricted viewing techniques may be applied to one or more segments in substantially real-time, e.g., as segments are buffered. In some embodiments, media content may be analyzed and classified into multiple classifications based on each frame (for visual content), segment, or scene, for example.

Figure 4:
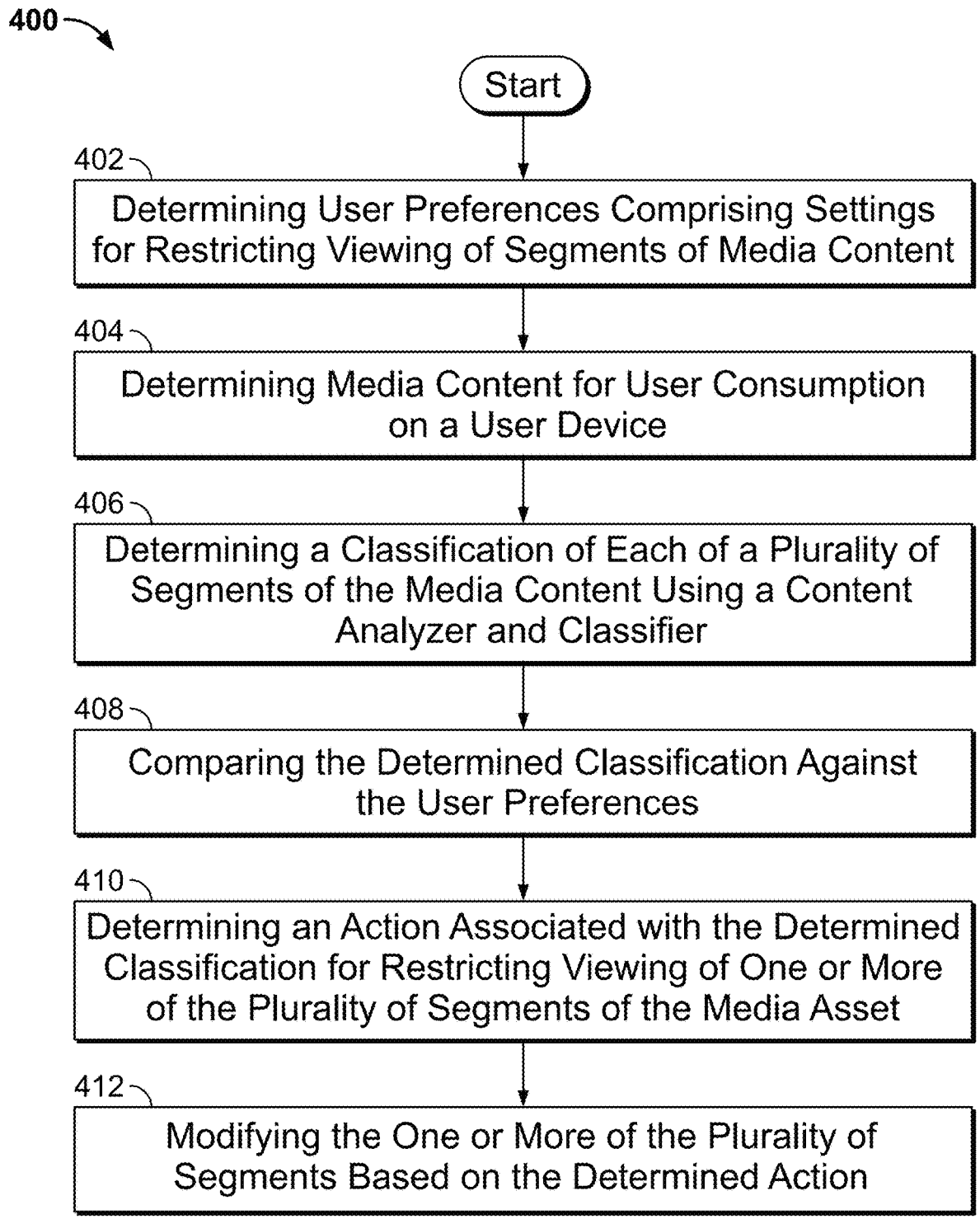
FIG. 4 is an illustrative flowchart for parental control of media content for a media guidance application, according to various embodiments disclosed herein.

FIG. 4 shows an example flowchart of the method described herein. More particularly, with reference to FIG. 4, a method for parental control of media content for a media guidance application, according to various embodiments disclosed herein, will now be described. In addition, one or more steps of process 400 may be incorporated into or combined with one or more steps of any other embodiment disclosed herein.

At step 402, user preferences comprising settings for restricting viewing of segments of media content are determined. In some embodiments, the step of determining user preferences comprises retrieving a user profile. In some embodiments, a user profile is identified and user preferences associated with the user profile can be retrieved. In some embodiments, one of the user preferences in relation to classifications may be a preference to take an action when such classifications are deemed to be present in a media asset based on the user's needs. For example, the user may select a PG rating for the classification "nudity" and 18+ rating for "abusive language" and "violence" based on his/her needs or preferences. In further embodiments, the step of determining user preferences may further comprise determining previous user behavior associated with the classification. Additionally, or alternatively, user behavior associated with the user profile may be monitored.

At step 404, the system carries out a step of detecting media content for user consumption on a user device. For example, the process may be implemented prior to user consumption of media content, e.g., content scheduled for viewing by the user, or during content consumption, e.g., dynamically and in real time.

At step 406, the system determines a classification of each of a plurality of segments of the media content using a content analyzer and classifier 310. In some embodiments, the step of determining a classification is carried out dynamically during or prior to media content being consumed by the user. In example embodiments, the classification comprises at least a category, e.g., nudity or violence, and a parental rating, e.g., PG or 18+.

In some embodiments, the step of determining the classification further comprises determining a confidence value or level of the classification of each of the plurality of segments and determining that the confidence level is over a confidence threshold. The confidence value may be generated with a trained network for example, the confidence value may be generated by a trained artificial intelligence engine, by a trained neural network and/or by machine learning. This may occur through supervised learning, semi-supervised learning and/or unsupervised learning.

At step 408, the process carries out a step of comparing the determined classification against the user preferences, and, in response to the comparing, e.g., in response to determining that the determined classification of one or more of the plurality of segments matches the user preferences, carries out the steps highlighted at step 410 and 412, as will be described below.

At step 410, the process carries out a step of determining an action associated with the determined classification for restricting viewing of one or more of the plurality of segments of the media asset. In some embodiments, while a user is viewing the content, an action may be performed in the form of any one or more of an overlay/a whisper/a pop-up message, for example, and can be displayed to notify the end user that some specific rated segment is about to play, and based on the messages the end user might not be interested in watching that segment, and the client devices will provide alternatives such as "skip the segment" or "blur segment" or "play an ad" for the segment duration, or perform any action automatically.

The action of the method may be one of displaying a pop-up, or blocking access to a segment of media content, based on classifications requiring limited viewing as indicated by the user, or based on past user behavior. For example, the pop-up may be a warning to a user that if they continue the action that they are performing, then another action may be performed. Blocking access to all content may comprise preventing access to a network, for example, the internet. Transmitting a message may comprise displaying an alert at another computing device, for example, displaying an alert on a mobile phone.

At step 412, the process carries out a step of modifying the one or more of the plurality of segments based on the determined action. In some embodiments, the media guidance application may generate, for display to the first user, a recommendation for an activity in response to detecting a scene, for example, categorized as requiring parental control, e.g., fast-forward or skip scene. This can be for an upcoming scene, for example, or implemented automatically based on previous user behavior. Furthermore, in some embodiments, the step of modifying the one or more of the plurality of segments comprises being carried out dynamically during or prior to media content being consumed by the user.

It will be appreciated that the media guidance application may perform one or more of the functions described above simultaneously. In this way, the user will be able to consume a modified media asset comprising one or more modified segments based on user preferences.

As referred to herein, the term, "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action. It should also be noted, the systems and/or methods described above may be applied to, or used in accordance with, other systems and/or methods. Additionally, any of the steps in said processes can be performed in any order, can be omitted, and/or can be combined with any of the steps from any other process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

While some portions of this disclosure may make reference to "convention," any such reference is merely for the purpose of providing context to the invention(s) of the instant disclosure, and does not form any admission as to what constitutes the state of the art.

What is claimed is:

1. A method for parental control of media content for a media guidance application, the method comprising:
   determining user preferences comprising, for each of a plurality of aspects of audience suitability of the media content, a user-set age rating, and a user-set restrictive action to be applied in relation to media content which exceeds the user-set age rating for that aspect of audience suitability, the user-set restrictive action being an action for restricting presentation of media content;

determining media content for user consumption on a user device;

determining a classification of each of a plurality of segments of the media content using a content analyzer and classifier, the classification comprising an aspect of audience suitability and an age rating in respect of the aspect of audience suitability;

comparing, for each aspect of audience suitability, the determined age rating against the user-set age rating for that aspect of audience suitability found in the user preferences; and in response to the comparing:

for each aspect of audience suitability, accessing the user preferences to determine the user-set restrictive action to be applied to the classified segment of media content;

modifying the classified segment based on the determined user-set restrictive action for each aspect of audience suitability; and notifying the user of the determined classification of a segment while presenting the media content.

2. The method of claim 1, wherein determining user preferences comprises retrieving a user profile.

3. The method of claim 1, wherein determining user preferences comprises determining previous user behavior associated with the classification.

4. The method of claim 1, wherein determining a classification is carried out dynamically during or prior to media content being consumed by the user.

5. The method of claim 1, wherein determining a classification comprises:

determining a confidence level of the classification of each of the plurality of segments; and determining that the confidence level is over a confidence threshold.

6. The method of claim 1, wherein the action comprises any one of: fast forward; blur segment; skip segment; play an advertisement.

7. The method of claim 1, wherein the action is determined based on previous user behavior.

8. The method of claim 1, further comprising displaying a modified media asset comprising the modified one or more of the plurality of segments.

9. The method of claim 1, wherein modifying the one or more of the plurality of segments comprises dynamically modifying the one or more of the plurality of segments during or prior to media content being consumed by the user.

10. The method of claim 1, wherein the user preference settings comprise a category and an age rating in respect of that category.

11. A system for parental control of a media asset, the system comprising:

memory storing instructions; and control circuitry configured to execute the instructions to:

determine user preferences comprising, for each of a plurality of aspects of audience suitability of the media content, a user-set age rating, and a user-set restrictive action to be applied in relation to media content which exceeds the user-set age rating for that aspect of audience suitability, the user-set restrictive action being an action for restricting presentation of media content;

determine media content for user consumption on a user device;

determine a classification of each of a plurality of segments of the media content using a content analyzer and classifier, the classification comprising an aspect of audience suitability and an age rating in respect of the aspect of audience suitability;

compare, for each aspect of audience suitability, the determined age-rating against the user-set age rating for that aspect of audience suitability found in the user preferences; and in response to the comparing:

for each aspect of audience suitability, access the user preferences to determine the user-set restrictive action to be applied to the classified segment of media content;

modify the classified segment of the media content based on the determined user-set restrictive action for each aspect of audience suitability; and notify the user of the determined classification of a segment while presenting the media content.

12. The system of claim 11, wherein the control circuitry is further configured to determine user preferences by retrieving a user profile.

13. The system of claim 11, wherein the control circuitry is further configured to determine user preferences by determining previous user behavior associated with the classification.

14. The system of claim 11, wherein the control circuitry is further configured to determine a classification to determine the classification dynamically (in real time) during or prior to media content being consumed by the user.

15. The system of claim 11, wherein the control circuitry is further configured to determine the classification by:

determining a confidence level of the classification of each of the plurality of segments; and determining that the confidence level is over a confidence threshold.

16. The system of claim 11, wherein the action comprises any one of: fast forward; blur segment; skip segment; play an advertisement.

17. The system of claim 11, wherein the action is determined based on previous user behavior.

18. The system of claim 11, wherein the control circuitry is further configured to display a modified media asset comprising the modified one or more of the plurality of segments.

19. The system of claim 11, wherein the control circuitry is further configured to modify the one or more of the plurality of segments dynamically during or prior to media content being consumed by the user.

20. The system of claim 11, wherein the user preference settings comprise a category and an age rating in respect of that category.

* * * * *